June 16, 1942. D. W. SHERMAN 2,286,582
INSULATED BODY MOUNTING FOR AUTOMOBILES
Filed Oct. 31, 1940
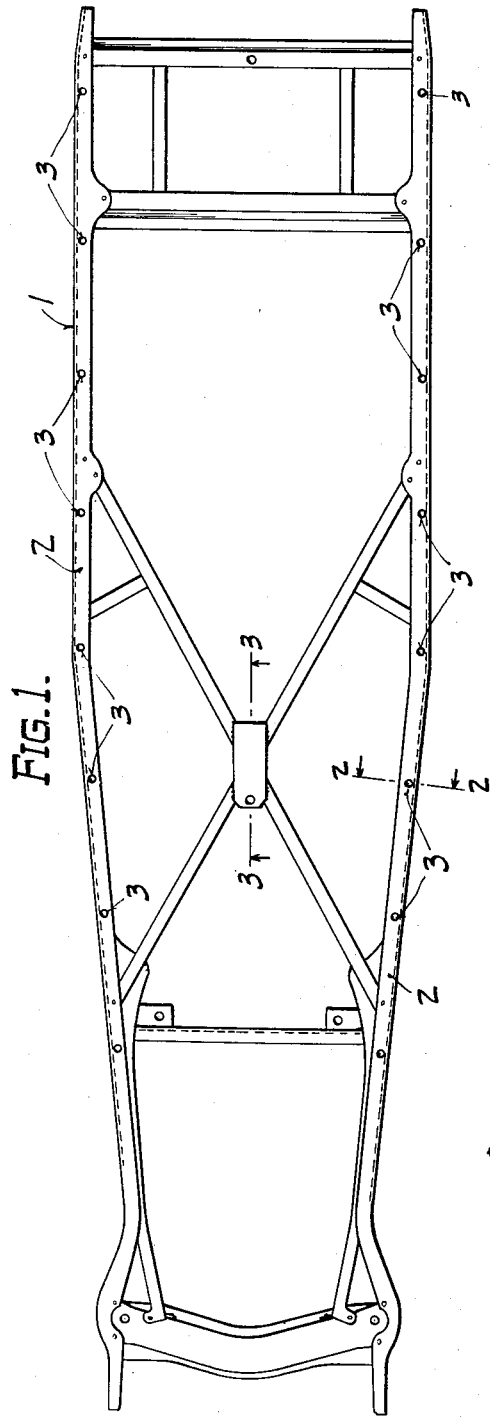
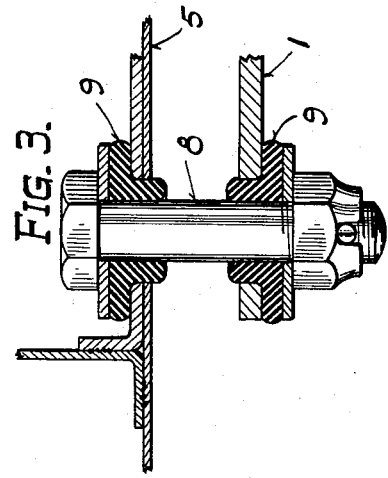
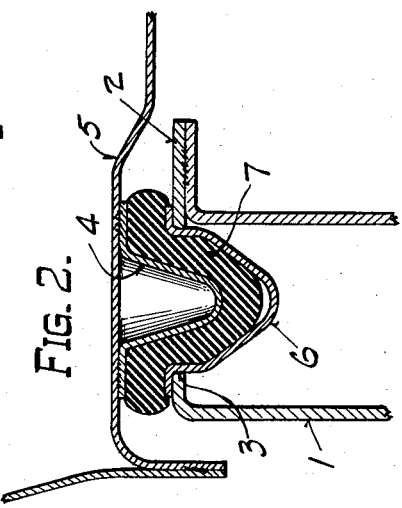
Donald W. Sherman
INVENTOR.
BY
ATTORNEY.

Patented June 16, 1942

2,286,582

UNITED STATES PATENT OFFICE 2,286,582

INSULATED BODY MOUNTING FOR AUTOMOBILES

Donald W. Sherman, Shorewood, Wis., assignor to A. O. Smith Corporation, Milwaukee, Wis., a corporation of New York Application October 31, 1940, Serial No. 363,649

2 Claims. (Cl. 296—35)

This invention relates to an insulated body mounting for automobiles.

The principal object of the invention is to provide a resilient body mounting to diminish the transmission of road noise and vibration from the chassis to the body.

This and other objects of the invention will be clear from the following detailed description and the drawing in which:

Figure 1 is a plan view of an automobile frame; Fig. 2 is a section on line 2—2 of Fig. 1; and Fig. 3 is a section on line 3—3 of Fig. 1.

The insulated body mounting is illustrated with a frame and body combination in which the mounting serves to hold the body against lateral fore and aft movement as well as downward movement relative to the frame.

The frame 1 may be of the well known X type as illustrated in the drawing or any other suitable type of frame. The upper flanges of the side rails 2 are provided with holes 3 for the reception of resilient spacing members inserted between the body and frame.

The spacing members consist of pressed steel cups or dowels 4 which are welded to the floor pan 5 of the body. In assembling a body to a frame, pressed cups 6 with an outward flange are loosely placed in the holes 3 and a resilient spacer 7 of rubber or other suitable material is placed in the cup. The body is then swung into place and positioned laterally and longitudinally on the frame by the entrance of dowels 4 into spacers 7. Shims may be placed between the frame and each cup 6 to take care of any height adjustment that may be necessary.

Hold down bolts 8 prevent vertical separation of the body from the frame. These bolts are provided with rubber or other resilient spacers 9 to prevent metal to metal contact between frame and body at the hold down points. Two hold down bolts, one at the center of the X cross member and one at the center of the rear cross member, will normally be sufficient although the dash mounts may also be hold down bolts as well if desired.

Under normal conditions of operation there is little or no tendency for the body to leave the frame, even when rounding curves. Consequently the number of hold down bolts can be limited since the stress imposed upon them is small. One of their principal functions to to prevent separation of frame and body if the car should overturn.

It will be seen that this system of mounting is simple and economical and provides substantially complete insulation against road noises and vibration by the elimination of metal to metal contact between the chassis and body.

The invention is claimed as follows:

1. In a device of the class described, a cushion element for spacing the body member of an automobile from the frame member on which it is mounted, comprising a cup shaped sheet metal element having an outer flange secured to one member, a projecting sheet metal element having an outer flange secured to the other member and its central portion projecting into and spaced from said cup shaped element, and a resilient cushion element spacing said elements apart and filling said cup shaped element, said cushion element being normally complementary to both of said elements with the exception of a space near its apex to provide an air chamber between it and one of said members and allow for flow of the cushion element.

2. In a device of the class described, a cushion element for spacing two members apart, comprising a cup shaped sheet metal element having an outer flange secured to one member, a projecting sheet metal element having an outer flange secured to the other member and its central portion projecting into and spaced from said cup shaped element, and a resilient substantially imperforate cushion member spacing said elements, said cushion member being normally complementary to both of said elements, and an air chamber near the apex of said cushion member to provide for flow of the member under compression.

DONALD W. SHERMAN.